Patented Oct. 16, 1928.

1,687,861

UNITED STATES PATENT OFFICE.

CECIL JOHN TURRELL CRONSHAW AND WILLIAM JOHNSON SMITH NAUNTON, OF MANCHESTER, ENGLAND, ASSIGNORS TO BRITISH DYESTUFFS CORPORATION LIMITED, OF MANCHESTER, ENGLAND.

VULCANIZATION OF RUBBER.

No Drawing. Application filed January 4, 1926, Serial No. 79,260, and in Great Britain March 12, 1925.

It is known that various diaryl-guanidines can be used as accelerators of the vulcanization of rubber. We have found that that the di-xylyl-guanidines and especially di-meta-xylyl-guanidines offer special advantages in this respect in that they give a better vulcanized product in a shorter time than the lower homologues hitherto employed. (Naunton, Jour. Soc. Chem. Industry, 1925, 44. p. 246. T.)

We prefer to manufacture the di-xylyl-guanidines by the method described in our British Patent No. 223,410, but the other known methods can also be used, and either pure xylidines or a mixture of the isomeric xylidines can be used as the initial material for the manufacture.

We claim:—

A process for accelerating the vulcanization of rubber which comprises combining rubber with dimeta-xylyl guanidine and vulcanizing the rubber.

In testimony whereof we have hereunto affixed our signatures.

CECIL JOHN TURRELL CRONSHAW.
WILLIAM JOHNSON SMITH NAUNTON.